Dec. 18, 1951   W. M. SCOTT, JR   2,578,750
CIRCUIT BREAKER STEEL BACK ISOLATION BARRIER
Filed Nov. 3, 1948   4 Sheets-Sheet 1

INVENTOR.
William M. Scott, Jr.
BY
Ostrolenk & Faber
Attorneys

Dec. 18, 1951  W. M. SCOTT, JR  2,578,750
CIRCUIT BREAKER STEEL BACK ISOLATION BARRIER
Filed Nov. 3, 1948  4 Sheets-Sheet 2

INVENTOR.
William M. Scott, Jr.
BY
Ostrolenk & Faber
Attorneys

INVENTOR.
William M. Scott, Jr.
BY Ostrolenk + Faber
Attorneys

Patented Dec. 18, 1951

2,578,750

UNITED STATES PATENT OFFICE 2,578,750

CIRCUIT BREAKER STEEL BACK ISOLATION BARRIER

William M. Scott, Jr., Bryn Mawr, Pa., assignor to I-T-E Circuit Breaker Company, Philadelphia, Pa., a corporation of Pennsylvania Application November 3, 1948, Serial No. 58,063

12 Claims. (Cl. 175—298)

My present invention relates to switchboards, and more particularly to the switchboards in the dead front type wherein a metallic panel, preferably of steel, divides the switchgear at the front of the switchboard from the bus compartments.

My present invention is a continuation in part of Patent No. 2,472,961 issued June 14, 1949, and utilizes, in order to achieve the dead front switchboard construction, the steel back panel type of circuit breaker disclosed in the foregoing application and certain of the principles of the said application.

My invention contemplates the arrangement of individual circuit breakers so that they are severally mounted on metal panels preferably made of steel. When the individual circuit breakers are then mounted in their respective compartments in the switchboard, the arrangement of the steel back panels of the circuit breakers is such as to isolate the switchgear section of each compartment from the bus housing of the switchboard.

My present invention has for its object the utilization of metal panel mounted circuit breakers in such manner as to achieve a simplified switchboard in which the front or operative portion of the switchboard is electrically isolated from the bus and other switchboard structures.

Another object of my invention is the arrangement of metal panel mounted circuit breakers so that the back panel of each circuit breaker serves as an isolation barrier whether or not the circuit breaker is movably or stationarily mounted in the switchboard and whether or not additional isolation barriers are used.

The foregoing and many other objects of my invention will become apparent from the following description and the accompanying drawings in which Figure 1 is a view in perspective of a low voltage switchboard with the side partially broken away in order to show the arrangement and relation of the several elements of my invention.

Figure 2:
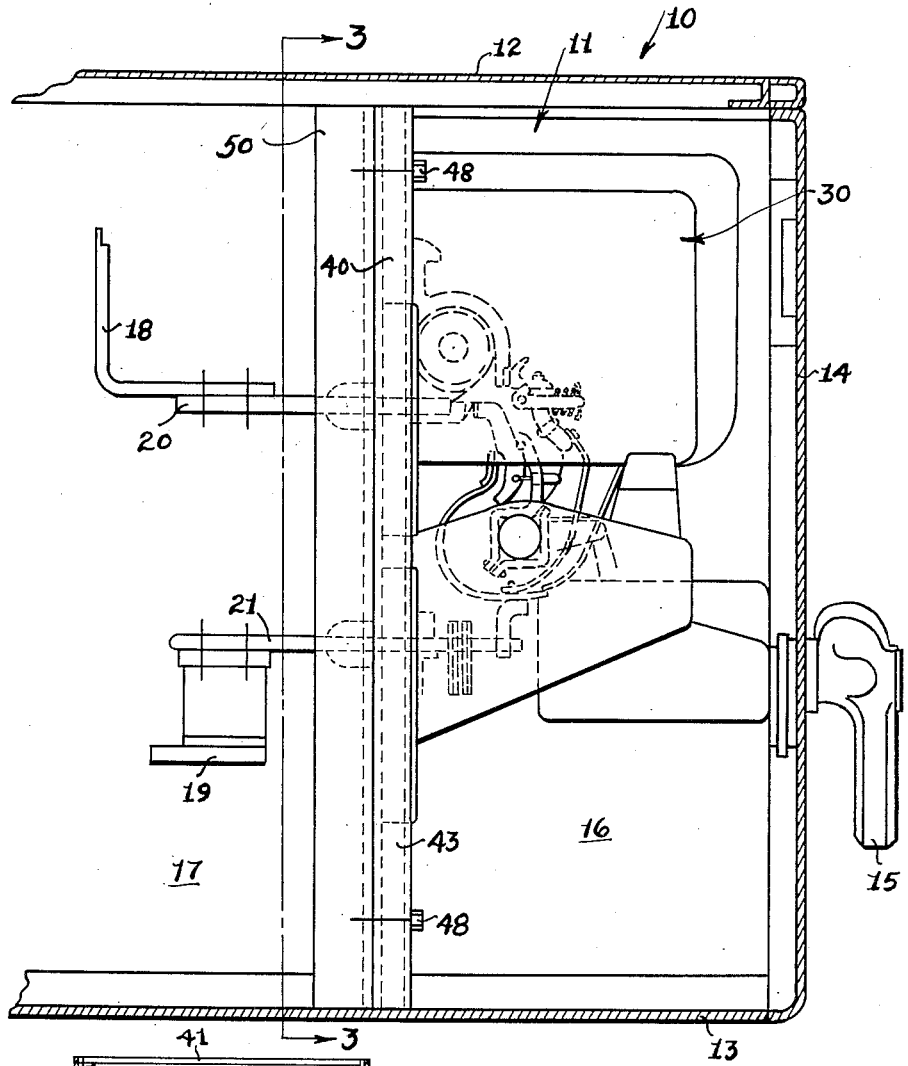
Figure 2 is a side view partly in cross-section of a metal back panel circuit breaker rigidly mounted in a steel enclosure wherein the steel back of the circuit breaker supporting panel forms an isolation barrier between the bus compartment and the circuit breaker compartment.
Figure 3:
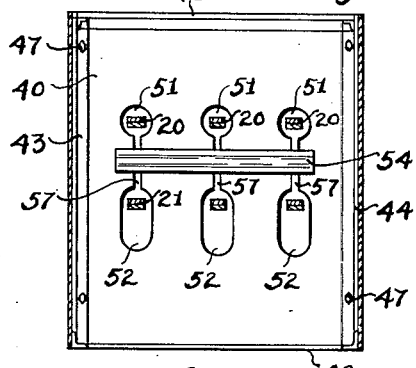
Figure 3 is a back view of the panel of the circuit breaker in Figure 2 taken from line 3—3 of Figure 2 looking in the direction of the arrows.

Referring first to Figures 2 and 3, the circuit breaker 30 is supported on a steel panel 40, which panel is of tray-like construction with a pair of horizontal flanges 41, 42 and a pair of grounded vertical columns 43, 44 formed by bending the material of the panel rectangularly at the vertical edges into a U-channel with the corners squared. The channels 43 and 44 include securing means 47, 47 through which bolts 48 may be passed to secure the panel 40 to vertical supporting members 50 within the switchboard 10.

The main body of the steel panel is provided with a plurality of openings 51 aligned horizontally adjacent the upper end thereof, said openings being provided to receive the upper back connection studs 20. Where the circuit breaker is constructed on a three-pole circuit breaker, then obviously three such openings 51 will be provided. Likewise the lower portion of the main body of panel 40 is provided with a plurality of openings 52 to receive the lower back connection studs 21.

Each pair of openings 51 and 52 is connected by a slot 57 in order to reduce eddy current effects in the panel which would serve to increase the heat generated in the panel. In appropriate cases, non-magnetic materials may be used for panel 40, such as non-magnetic steels, aluminum sheets, magnesium sheets, and any other strong non-magnetic material. The vertical columns or channels 43, 44 are provided primarily for reinforcement of the panels as a whole, and the panel is made in the form of a tray in order to rigidify and strengthen the unit.

The panel may if desired be reinforced in any suitable manner as by a steel strip 54 welded or otherwise secured across the back. This strip may have a bead or other channel formation in order to rigidify the same. Where deired, and in order to avoid magnetic effects, the strip 54 may be of stainless steel. Any number of such strips may be used as required.

In Figure 2 I have shown the circuit breaker 30 and its steel panel 40 mounted against the posts 50 within the compartment 11 of the switchboard 10. The compartment 11 has a top wall 12 which may also be the top wall of the switchboard, a bottom wall 13, and steel side walls. It also has a steel front door or panel 14 and an appropriate circuit breaker operator 15 accessible from the outside of the door or panel 14.

The specific compartment 11 of the switchboard 10 is therefore divided into two principal compartments 16 and 17 by the steel back 40 of the circuit breaker. Compartment 16 contains the circuit breaker 30 and its associated elements including all such elements as may be mounted on the front of the switchboard panel. Compartment 17 contains the buses 18 and 19 which are connected respectively in any suitable manner to the upper and lower back connection studs 20 and 21.

It will thus be seen that the steel panel 40 acts as an enclosure for the bus connections behind the steel panel, so that the switchboard becomes essentially a dead front switchboard owing to the fact that all of the circuit breakers are backed up by the steel panels forming gas resistant barriers between each circuit breaker and its associated bus runs. Arcing in the circuit breaker can therefore not flash over into the bus run compartment.

The construction of the steel panel and circuit breaker mounting used in connection therewith is particularly adapted for low voltage circuit breakers, for 600 volts or below. In the past this type of breaker has been mounted on slate or ebony asbestos panels quite universally. In these designs the live parts of the breaker have been spaced on the insulating base so as to provide the proper creepage distance over the insulation. The use of a steel panel is possible only when the moldings are provided with flanges which increase the creepage distance between live parts and the steel panel which is grounded. By using flanges on the moldings, it is possible to mount the live parts relatively close together and still obtain adequate insulation.

The use of a steel panel has been dictated by the requirement that the panel be very much lighter than it was before, particularly on shipboard where weight is important. Steel is also stronger and not subject to breakage. It is particularly desirable where shock tests are required and breakage of insulating panels has occurred. Steel is also fireproof. Where switchboard fires have occurred in the past, it has resulted in the destruction of the insulating panels. Steel also provides a grounded metal barrier between the front of the breaker and whatever is at the rear.

Figure 1:
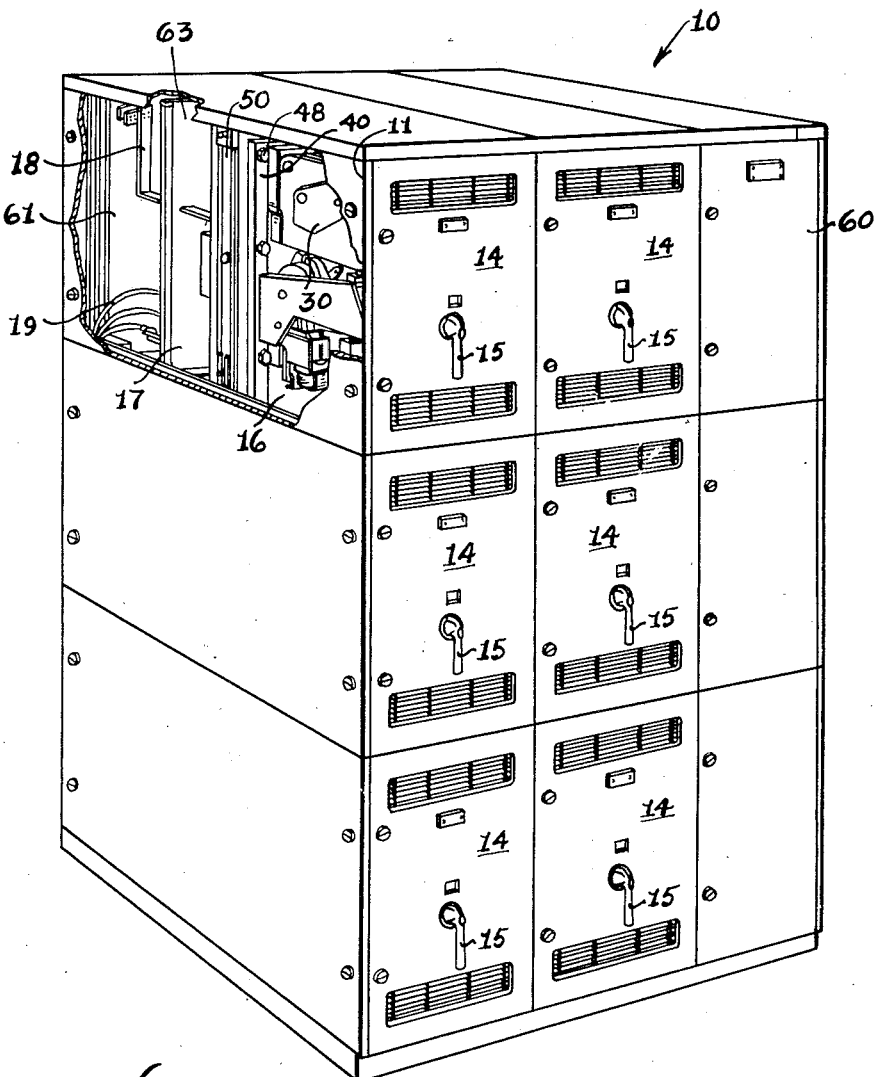

In Figure 1 I have shown my novel switchboard 10 having a plurality of compartments 11, each having a front door or panel 14. In addition to the compartments 11 for switchgear, other compartments 60 may be provided for other apparatus necessarily associated with switchboards.

In this case each of the compartments 11 carries the circuit breaker 30 on the steel panel 40 which is secured to the vertical posts 50 by bolts 48. The steel panel 48 and the front panel 14 thus define the switchgear section 16 of each compartment. The bus section 17 of each compartment is defined by the steel panel 40 of the circuit breaker and the back wall 61 of the switchboard or of each compartment.

Where additional isolation is desired as in the case where disconnect contacts are used located between the circuit breaker panel and the buses, then an additional steel isolation panel 63 may be used in the compartment dividing the main portions of buses 18 and 19 from the back connection studs. This type of additional steel panel is indicated generally in Figure 1 and may if desired be used in connection with the construction of Figure 2 although it is more readily adapted to the disconnect type of structure shown in Figure 6 hereinafter described.

Figure 4:
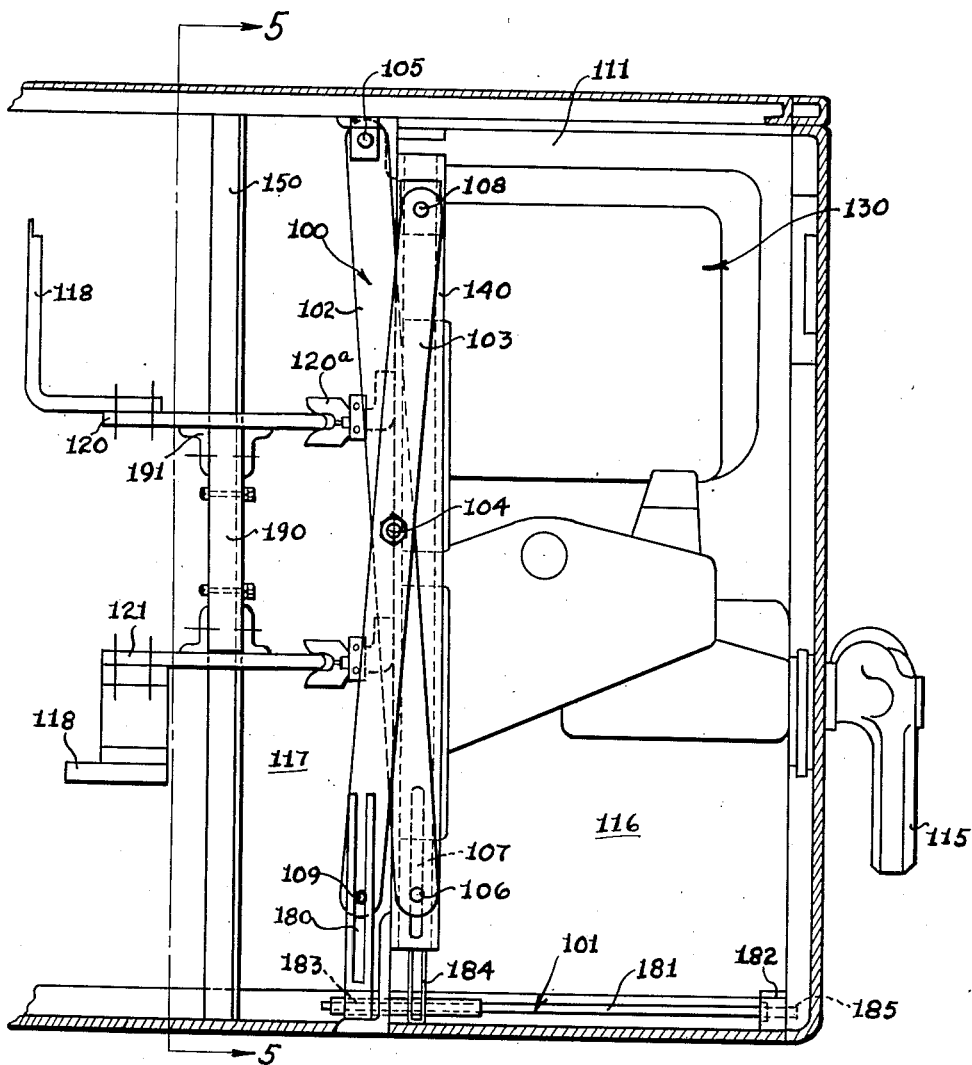
Figure 4 is a side view partly in section showing a pantograph mounted withdrawal type of circuit breaker having a steel back panel and a primary disconnect.
Figure 5:
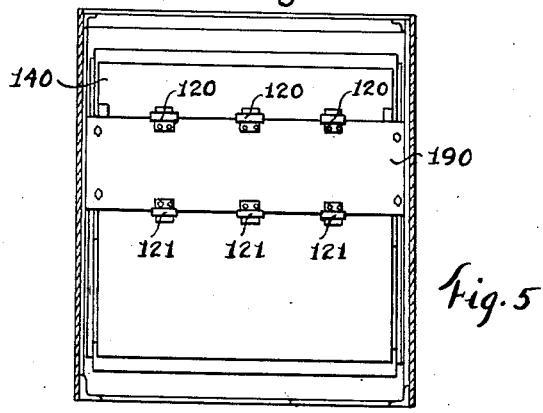
Figure 5 is a back view of the circuit breaker and disconnect mounting taken from line 5—5 of Figure 4 looking in the direction of the arrows.

In Figures 4 and 5 I have shown a modified form of the switchboard compartment 111 containing a front switchgear section 116 and a rear bus section 117 isolated from each other by the steel panel 140 of circuit breaker 130. The steel panel 140 is substantially identical in all respects with the panel of Figure 3 and with the panel described in connection with Figures 1 and 2. In this case the steel panel 140 is mounted on a pantograph structure 100 which enables the circuit breaker 130 and its panel 140 to be racked in and out of the compartment by means of the racking mechanism indicated schematically at 101.

Pantograph type mounting of circuit breakers is shown in Patent No. 2,324,543 and requires no further description here, and means for racking pantograph and other types of circuit breakers in and out is shown in Patent No. 2,364,465 and requires no further description here.

It is sufficient, however, to point out that the pantograph structure 100 comprises a pair of links 102, 103 on each side of the structure, the links being pivotally connected by the floating pivot 104. The upper end of link 102 is stationarily pivoted at 105 at the top of the compartment. The lower end of link 102 is slidingly pivoted at 106 in the slot 107 on the side of the circuit breaker panel 140. The upper end of link 103 is stationarily pivoted at 108 at the upper end of panel 140. The lower end of link 103 is slidingly pivoted at 109 in the slot 180 at the lower end of the compartment.

This structure is duplicated on both sides.

The racking mechanism 101 comprises a screw 181 rotatable in stationary bearings 182 and 183 and having a screw thread engagement at 184 with an extension from the lower end of the panel. The outer end of screw 181 at 185 is square or otherwise formed so that an appropriate tool may engage the same to rotate the screw 181. Rotation thereof causes the panel to move in and out in accordance with the sense of rotation of screw 181 while the screw remains stationary as far as longitudinal movement is concerned.

The back connection studs 120 and 121 connected respectively to the buses 118 and 119 are supported by the insulating panel 190, being secured thereto by suitable brackets 191 and resting respectively on the top and bottom edges of the insulating panel 190. Panel 190 is in turn supported between the side posts 150. In this case, however, the back connecting elements 120 and 121 are not shown directly connected to the circuit breaker but actually comprise the movable and stationary members of a primary disconnect. The female elements 120a and 121a are carried on the rear surface of the steel panel 140, being appropriately insulated therefrom.

This type of disconnect is shown in Patents 2,029,028 and 2,472,961 and requires no further description here.

It will thus be seen that the circuit breaker compartment 116 is at all times isolated from the bus compartment 117 by the steel panel 140.

Figure 6:
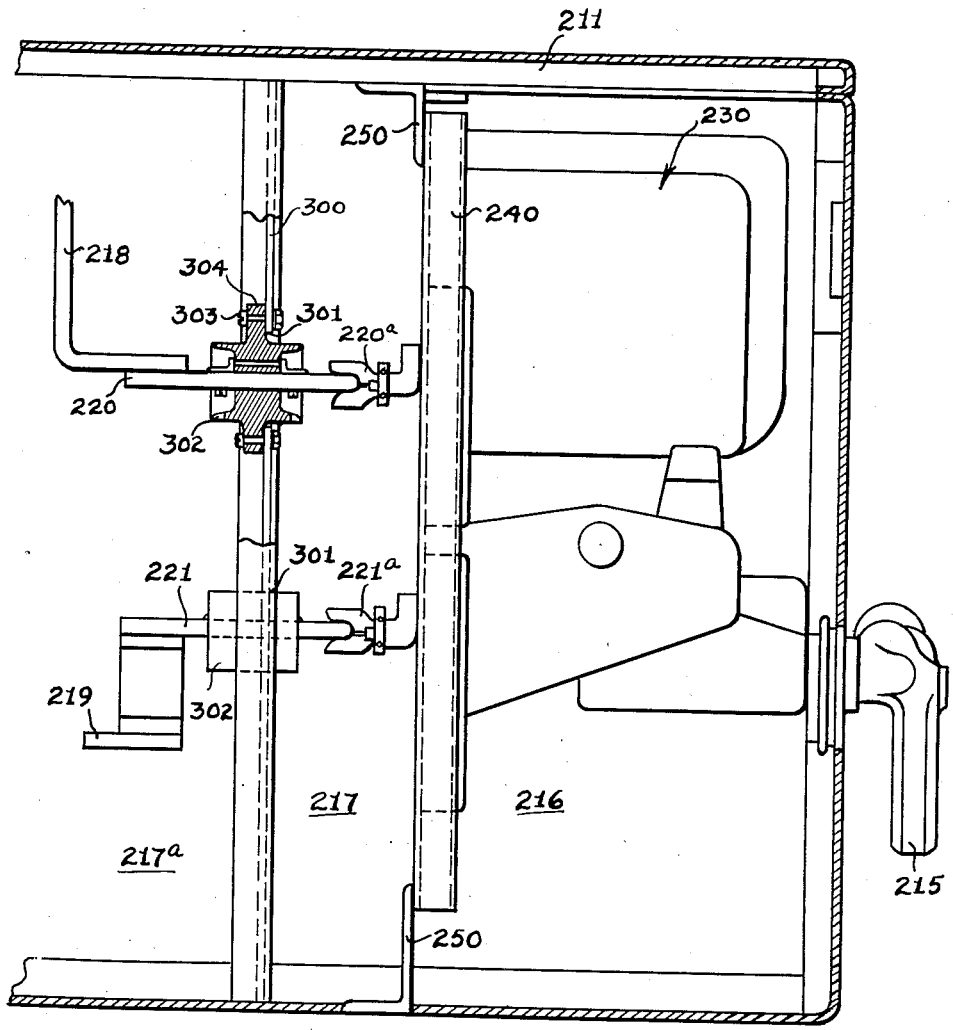
Figure 6 is a side view partly in section of a steel back circuit breaker mounted in its compartment in a construction similar to that of Figure 4 but showing a movable circuit breaker which may readily be removed from and mounted in the compartment, the said circuit breaker, however, not being mounted on a pantograph structure.

In Figure 6 I have shown a modification of the construction of Figure 4 wherein the circuit breaker 230 in compartment 211 is mounted on the steel panel 240 which is similar in all respects to the panel 40 of Figure 3. The steel panel is stationarily mounted in the compartment in any suitable manner as by being secured to the brackets 250, 250 within the compartment.

However, instead of a rigid back connection stud as shown in Figure 2, disconnect type back connection studs 220a and 221a are provided to connect respectively to the stationary disconnects 220 and 221 which in turn are connected in any suitable manner to the buses 218 and 219.

In this case, in addition to the steel panel 240 which serves as the mounting for the circuit breaker and its various associated elements, an additional steel panel 300 is provided arranged parallel to the panel 240 and having openings 301, 301 through which are inserted insulating tubes 302, 302 which in turn are secured in any suitable manner as by bolts 303 fastened through annular flanges 304 of the tubes and appropriate openings in the steel panel.

The tubes 302 may be made sufficiently long to ensure complete insulation of the disconnect elements 220 and 221 carried thereby from the steel panel 300 so that the steel panel 300 serves as a support for the elements 220 and 221 without short circuiting them.

The steel panel 300 and the steel panel 240 of the circuit breaker therefore serve to divide the circuit breaker compartment 211 into a front compartment 216 for the switchgear and intermediate compartment 217 for the disconnects and a third rear compartment 217a for the buses. Thus any fault which may arise in the bus compartment 217a will be grounded by the steel panel 300 and any fault which may arise at the disconnects 220a and 221a will be grounded by the steel panel 240.

The dead front protection for the circuit breaker assemblies in the front sections of the switchboard compartments is thereby increased. By therefore utilizing a metal panel as the support for a circuit breaker and by making a metallic panel equal in size to the interior cross-sectional dimensions of the compartment, it becomes possible to construct a simplified dead front switchboard, which structure is achieved solely by mounting the circuit breakers and their panels in position and without the necessity for additional metallic structures.

Where further dead front protection is required, as for instance where it is desired to separate the bus compartment from the disconnects and the disconnects from the circuit breakers, then the disconnects may be supported by a metallic panel being appropriately insulated therefrom and the said metallic panel will provide for additional isolation, making possible even further protection at the front of the switchboard.

In the foregoing I have described an illustrative embodiment of my invention. Since many modifications and variations of my invention will now be apparent to those skilled in the art, I prefer not to be bound by the description herein set forth but only by the appended claims.

I claim:

1. In a distribution switchboard, a plurality of circuit breakers, a grounded steel panel for each circuit breaker, means for mounting each of said circuit breakers on its associated grounded steel panel, each panel having horizontal and vertical flanges to form a tray construction, vertical supporting members, means for securing said panels to said supporting members, back connection studs individual to each of said circuit breakers, a plurality of pairs of openings for receiving said pair of back connection studs, each pair of openings being connected by a slot to reduce eddy current effects in said panel, a compartment for each of said circuit breakers comprising said panel, a top wall, bottom wall, steel side walls and a steel front, said top, bottom and side walls etxending beyond said panel and forming a second compartment, means for operating the circuit breaker and its grounded steel panel and back connection studs into and out of its compartment, said first compartment containing said circuit breaker and its steel panel isolating said circuit breaker from the bus compartment when the circuit breaker is operated into its compartment, bus runs for each said circuit breaker connected to said studs, said bus runs being located in said second compartment and isolated from its associated circuit breaker by said steel panel.

2. In a distribution switchboard, a plurality of circuit breakers, a grounded steel panel for each circuit breaker, means for mounting each of said circuit breakers on its associated grounded steel panel, each panel having horizontal and vertical flanges to form a tray construction, vertical supporting members, means for securing said panels to said supporting members, back connection studs individual to each of said circuit breakers, a compartment for each of said circuit breakers comprising said panel, a top wall, bottom wall, steel side walls and a steel front, said top, bottom and side walls extending beyond said panel and forming a second compartment, means for operating the circuit breaker and its grounded steel panel and back connection studs into and out of its compartment, said first compartment containing said circuit breaker and its steel panel isolating said circuit breaker from the bus compartment when the circuit breaker is operated into its compartment, bus runs for each said circuit breaker connected to said studs, said bus runs being located in said second compartment and isolated from its associated circuit breaker by said steel panel.

3. In a distribution switchboard, a plurality of circuit breakers, a grounded steel panel for each circuit breaker, means for mounting each of said circuit breakers on its associated grounded steel panel, each panel having horizontal and vertical flanges to form a tray construction, vertical supporting members, means for securing said panels to said supporting members, back connection studs individual to each of said circuit breakers, a plurality of pairs of openings for receiving said pair of back connection studs, a compartment for each of said circuit breakers comprising said panel, a top wall, bottom wall, steel side walls and a steel front, said top, bottom and side walls extending beyond said panel and forming a second compartment, means for operating the circuit breaker and its grounded steel panel and back connection studs into and out of its compartment, said first compartment containing said circuit breaker and its steel panel isolating said circuit breaker from the bus compartment when the circuit breaker is operated into its compartment, bus runs for each said circuit breaker connected to said studs, said bus runs being located in said second compartment and isolated from its associated circuit breaker by said steel panel.

4. In a distribution switchboard, a plurality of circuit breakers, a grounded steel panel for each circuit breaker, means for mounting each of said circuit breakers on its associated grounded steel panel, vertical supporting members, means for securing said panels to said supporting members, back connection studs individual to each of said circuit breakers, a plurality of pairs of openings for receiving said pair of back connection studs, a compartment for each of said circuit breakers comprising said panel, a top wall, bottom wall, steel side walls and a steel front, said top, bottom and side walls extending beyond said panel and forming a second compartment, means for operating the circuit breaker and its grounded steel panel and back connection studs into and out of its compartment, said first compartment containing said circuit breaker and its steel panel isolating said circuit breaker from the bus compartment when the circuit breaker is operated into its compartment, bus runs for each said circuit breaker connected to said studs, said bus runs being located in said second compartment and isloated from its associated circuit breaker by said steel panel.

5. In a distribution switchboard, a plurality of circuit breakers, a grounded steel panel for each circuit breaker, means for mounting each of said circuit breakers on its associated grounded steel panel, back connection studs individual to each of said circuit breakers, a plurality of pairs of openings for receiving said pair of back connection studs, a compartment for each of said circuit breakers comprising said panel, a top wall, bottom wall, steel side walls and a steel front, said top, bottom and side walls extending beyond said panel and forming a second compartment, means for operating the circuit breaker and its grounded steel panel and back connection studs into and out of its compartment, said first compartment containing said circuit breaker and its steel panel isolating said circuit breaker from the bus compartment when the circuit breaker is operated into its compartment, bus runs for each said circuit breaker connected to said studs, said bus runs being located in said second compartment and isolated from its associated circuit breaker by said steel panel.

6. In a switchboard, a plurality of circuit breakers, a plurality of compartments, one for each of said circuit breakers, each compartment having a grounded front steel panel, a grounded back steel panel, means for mounting each of said circuit breakers on its associated back panel, said grounded back steel panel being a part of and movable with said circuit breaker into and out of its compartment, side walls, top and bottom walls, each of said walls extending beyond said back panel forming adjacent compartments, a back wall for each said adjacent compartments and bus runs for each circuit breaker mounted in the associated adjacent compartments and isolated from its associated circuit breaker by said back steel panel.

7. In a switchboard, a plurality of circuit breakers, a plurality of compartments, one for each of said circuit breakers, each compartment having a grounded front steel panel, a grounded back steel panel, means for mounting each of said circuit breakers on its associated back panel, said grounded back steel panel being a part of and movable with said circuit breaker into and out of its compartment, side walls, top and bottom walls, each of said walls extending beyond said back panel forming adjacent compartments, a back wall for each said adjacent compartments and bus runs for each circuit breaker mounted in the associated adjacent compartments, and isolated from its associated circuit breaker by said back steel panel, disconnect contacts for each of said circuit breakers and an additional steel isolating panel intermediate said back panel and back wall for said disconnects.

8. In a switchboard, a plurality of circuit breakers, a plurality of compartments, one for each of said circuit breakers, each compartment having a grounded front steel panel, a grounded back steel panel, means for mounting each of said circuit breakers on its associated back panel, said grounded back steel panel being a part of and movable with said circuit breaker into and out of its compartment, side walls, top and bottom walls, each of said walls extending beyond said back panel forming adjacent compartments, a back wall for each said adjacent compartments and bus runs for each circuit breaker mounted in the associated adjacent compartments, and isolated from its associated circuit breaker by said back steel panel, disconnect contacts for each of said circuit breakers, an additional steel isolating panel intermediate said back panel and back wall for said disconnects, and drawout mechanism individual to and connected to each circuit breaker for withdrawing its associated said circuit breaker from its compartment.

9. In a distribution switchboard, a plurality of circuit breakers, individual steel compartments for each circuit breaker, each compartment including a metallic panel, each circuit breaker being mounted on its associated metallic panel, said metallic panel being a part of and movable with said circuit breaker into and out of its compartment, a switchboard frame, bus runs, associated individual steel compartments for said bus runs, each of said panels being mounted on said frame and forming a grounded, gas-resistant barrier between each circuit breaker and its associated bus run.

10. In a distribution switchboard, a plurality of circuit breakers, individual steel compartments for each circuit breaker, each compartment including a metallic panel, top, bottom and side walls of metal, each circuit breaker being mounted on its associated panel, said metallic panel being a part of and movable with said circuit breaker into and out of its compartment, a switchboard frame, bus runs, associated individual steel compartments for said bus runs, each of said panels being mounted on said frame and forming with said walls a grounded, gas-resistant barrier between each circuit breaker and its associated bus run.

11. In a switchboard, a circuit breaker, a grounded metal panel, means for mounting said circuit breaker on said metal panel, a metal compartment for said circuit breaker including a grounded metal front panel, side, top and bottom panels, a bus compartment adjacent said first mentioned compartment, said first mentioned metal panel supporting said circuit breaker constituting a base panel for said first mentioned compartment and forming a grounded gas resistant metal barrier between the circuit breaker and bus compartment, means for racking said circuit breaker and its metal panel into and out of said circuit breaker compartment, said metal panel when it is racked in position comprising the barrier between said circuit breaker and bus compartment.

12. In a switchboard, a circuit breaker, a grounded metal panel, means for mounting said circuit breaker on said metal panel, a metal compartment for said circuit breaker, including a grounded metal front panel, side, top and bottom panels, a bus compartment for said first mentioned compartment, said first mentioned metal panel supporting said circuit breaker constituting a base panel for said first mentioned compartment and forming a grounded gas resistant metal barrier between the circuit breaker and bus compartment, a compartment for disconnects intermediate said circuit breaker and bus compartments, studs for said circuit breaker engageable with said disconnects, said studs extending through said first mentioned grounded panel carrying said circuit breaker, said first mentioned panel forming a gas resistant metal barrier between said circuit breaker and said disconnects and a second grounded metal barrier carrying said disconnects and forming a grounded gas resistant metal barrier between said disconnects and said bus compartment.

WILLIAM M. SCOTT, Jr.

REFERENCES CITED

The following references are of record in the file of this patent:

UNITED STATES PATENTS

| Number | Name | Date |
| --- | --- | --- |
| 1,954,583 | Caswell | Apr. 10, 1934 |
| 2,037,900 | Hastings | Apr. 21, 1936 |
| 2,041,112 | Bucher | May 19, 1936 |
| 2,424,345 | West | July 22, 1947 |
| 2,438,025 | Taliaferro | Mar. 16, 1948 |
| 2,441,485 | Graves | May 11, 1948 |